United States Patent
Gerceker

(10) Patent No.: US 9,464,726 B2
(45) Date of Patent: Oct. 11, 2016

(54) SHUT-OFF DEVICE FOR PIPELINES

(71) Applicant: Metso Automation Mapag GmbH

(72) Inventor: Metin Gerceker, Neusass (DE)

(73) Assignee: METSO FLOW CONTROL OY, Vantaa (FI)

( * ) Notice: Subject to any disclaimer, the term of this patent is extended or adjusted under 35 U.S.C. 154(b) by 5 days.

(21) Appl. No.: 14/479,961

(22) Filed: Sep. 8, 2014

(65) Prior Publication Data

US 2014/0374638 A1    Dec. 25, 2014

(51) Int. Cl.
*F16K 27/02* (2006.01)

(52) U.S. Cl.
CPC .......... *F16K 27/0218* (2013.01); *Y02E 60/321* (2013.01)

(58) Field of Classification Search
CPC ..................... F16K 27/0218; Y02E 60/321
USPC .................... 251/305–308, 360–363, 315.12
See application file for complete search history.

(56) References Cited

U.S. PATENT DOCUMENTS

| | | |
|---|---|---|
| 2,820,605 A | 1/1958 | Dougherty |
| 3,096,966 A | 7/1963 | McFarland |
| 3,891,183 A | 6/1975 | Feiring |
| 4,241,895 A | 12/1980 | Sternenberg et al. |
| 4,281,680 A | 8/1981 | Ripert |
| 4,281,818 A | 8/1981 | Cunningham et al. |
| 4,508,139 A | 4/1985 | Teumer |
| 4,562,860 A | 1/1986 | Walter et al. |
| 4,637,421 A | 1/1987 | Stunkard |
| 4,658,978 A | 4/1987 | Ikematsu |
| 4,718,444 A | 1/1988 | Boelte |
| 4,802,652 A | 2/1989 | Kaniut et al. |
| 5,069,240 A | 12/1991 | Kurkjian, Jr. |
| 5,088,687 A | 2/1992 | Stender |
| 5,313,976 A | 5/1994 | Beasley et al. |
| 5,551,479 A | 9/1996 | Graves |
| 5,664,760 A | 9/1997 | Army et al. |

(Continued)

FOREIGN PATENT DOCUMENTS

| | | |
|---|---|---|
| DE | 195 087 89 | 2/1996 |
| EP | 0 925 464 | 6/1999 |

(Continued)

OTHER PUBLICATIONS

International Search Report for PCT/EP2006/005139 dated Sep. 4, 2006.

(Continued)

*Primary Examiner* — John Bastianelli
(74) *Attorney, Agent, or Firm* — Millen, White, Zelano & Branigan, P.C.

(57) ABSTRACT

A shut-off device for low-temperature media includes a housing (2), a valve seat (5) located in the housing (2), and a valve (3) that cooperates with the valve seat and is pivotally supported in the housing (2). On the housing (2) there is at least one flange (10) for mounting the shut-off device in a pipeline. The low-temperature shut-off device, low construction cost and low maintenance cost is achieved because the flange (10) of the housing (2) is designed as a welding flange (10*a*, 10*b*) for attachment of the shut-off device (1) in the pipeline by a weld joint, especially a butt weld joint, and because the housing (2) is provided with a housing opening (11) for mounting and/or removing the valve (3).

11 Claims, 3 Drawing Sheets

(56) References Cited

U.S. PATENT DOCUMENTS

Figure 1:
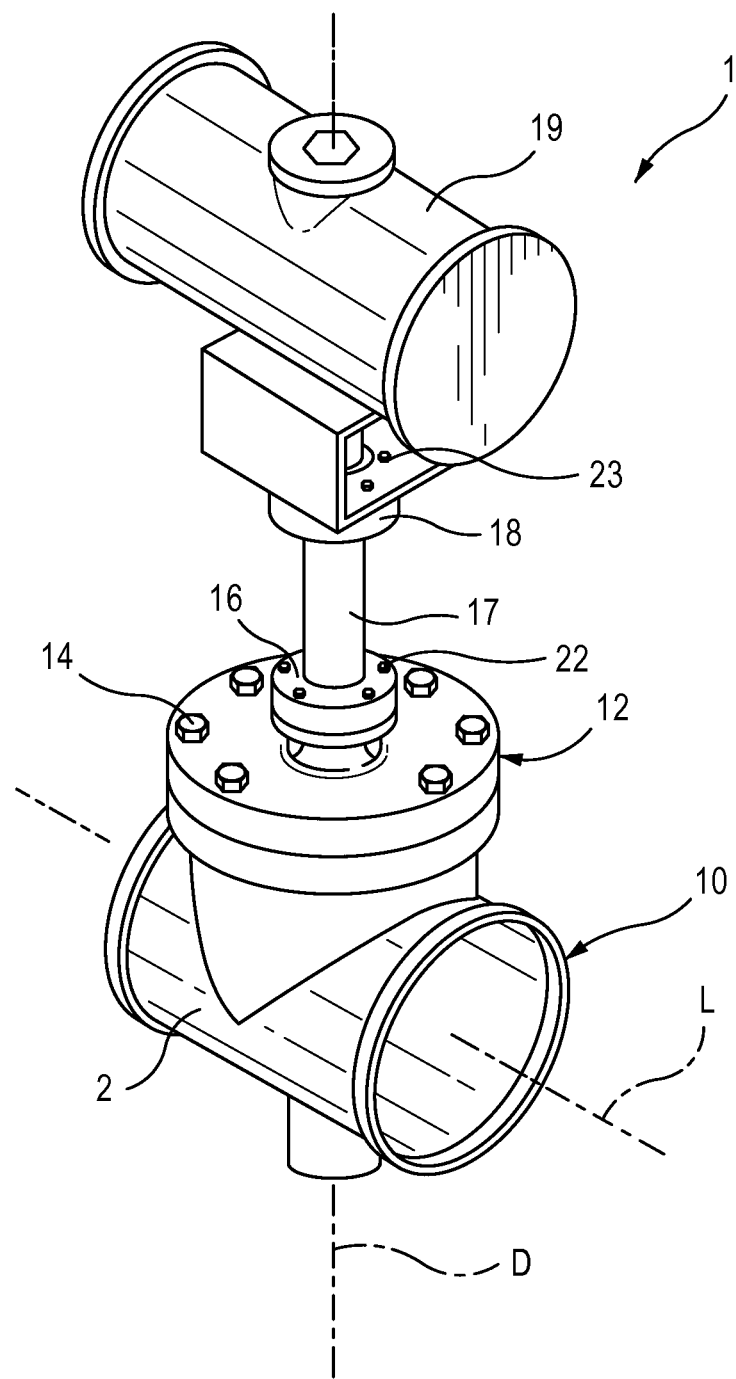

| | | |
|---|---|---|
| 5,707,040 A | 1/1998 | Gasaway |
| 5,873,389 A | 2/1999 | Cheng |
| 5,941,266 A | 8/1999 | Henwood |
| 6,039,069 A | 3/2000 | Gonsior et al. |
| 6,293,518 B1 | 9/2001 | Illy et al. |
| 6,726,177 B2 | 4/2004 | Wang |

FOREIGN PATENT DOCUMENTS

| | | |
|---|---|---|
| EP | 0 942 212 | 9/1999 |
| GB | 1 139 182 | 1/1969 |
| GB | 2 206 672 | 1/1989 |
| GB | 2 222 869 | 3/1990 |
| SU | 1 151 746 | 4/1985 |
| SU | 1 638 407 | 3/1991 |

OTHER PUBLICATIONS

Rautenkranz Int Hermann, "Top entry ball valve for pipelines," Espacenet, Publciation Date: Feb. 22, 1996; English Abstract of DE-195 087 89.

Dedkov Aleksej K, "Cryogenic Disc Rotary Valve," Thomas Innovation—Patent Record View, Publication Date: Apr. 23, 1985; English Abstract of SU-1 151 746.

Valov Aleksandr A., "Cock," Thomson Innovation—Patent Record View, Publication Date: Mar. 30, 1991; English Abstract of SU-1 638 407.

SHUT-OFF DEVICE FOR PIPELINES

RELATED APPLICATION DATA

This is a continuation-in-part of U.S. application Ser. No. 13/483,833, filed May 30, 2012, which is a continuation of U.S. application Ser. No. 11/917,697, filed Dec. 14, 2007, which is a National State Entry of PCT/EP2006/005139, filed May 30, 2006.

The invention relates to a shut-off device for low-temperature media, with a housing, a valve seat located in the housing, and a butterfly valve that triggers the valve seat and that is pivotally supported in the housing, on the housing at least one flange being designed for mounting the shut-off device in a pipeline.

Such low-temperature shut-off devices are used to shut off pipelines in which flow cryogenic media, for example liquid natural gas, liquid hydrogen, liquid air or components thereof, especially liquid nitrogen, liquid oxygen or liquid helium.

To install the low-temperature shut-off device in the pipeline, the housing of the shut-off device is provided on both pipe-side ends with one mounting flange each. In known low-temperature shut-off devices, the mounting flange is designed as a screw flange, the mounting flange being formed by an annular flange component that is located on the outer periphery of the housing and that is designed with through-holes to accommodate fastening screws.

Such mounting flanges, however, have a high construction cost. Moreover, to seal the shut-off device against leaks in the region of the mounting flange, a sealing means is necessary, for example a ring seal that engenders a high construction cost due to the low-temperature application.

For the known low-temperature shut-off devices, the valve seat and the butterfly valve can be mounted and removed in the longitudinal direction of the housing. To maintain the shut-off device, the shut-off device must thus be removed from the pipeline by means of the mounting flange in order to be able to remove the valve seat and the butterfly valve from the housing. For this reason, the shut-off device engenders a high maintenance cost.

The object of this invention is to make available a low-temperature shut-off device of the initially-mentioned type that engenders a low construction cost and maintenance cost.

This object is achieved according to the invention in that the flange of the housing is designed as a welding flange for installation of the shut-off device in the pipeline by means of a weld joint, especially a butt weld joint, and the housing is provided with a housing opening for mounting and/or removing the butterfly valve. With a welding flange, the housing being connected to the pipeline by means of a weld joint, especially a butt weld joint, a leak-free connection of the housing and thus of the shut-off device to the pipeline can be achieved at low construction cost, and reliable operation of the shut-off device is made possible. By mounting or removing the butterfly valve through the housing opening, moreover, low maintenance cost can be achieved, the housing remaining connected to the pipeline and the butterfly valve being easily mounted and removed via the housing opening.

Special advantages arise when—according to one embodiment of the invention—the valve seat is made on a valve seat component that is detachably mounted in the housing by means of a flange, especially a screw flange, and the valve seat component can be mounted and/or removed through the housing opening. Via the housing opening, the valve seat component can be easily mounted and removed for maintenance purposes when the housing is located in the pipeline. Moreover, for this reason, it is easily possible to arrange the valve seat components with different valve seats and/or sealing systems in the housing, by which the shut-off device can be easily matched to different conditions of use.

Advantageously, the housing opening is located perpendicular to the axis of rotation of the butterfly valve, by which simple mounting and removal of the butterfly valve and of the valve seat component are made possible via the housing opening.

Special advantages arise when—according to one embodiment of the invention—the housing diameter of the housing in the region of the welding flange corresponds to the diameter of the pipeline. In this way, the housing can be easily connected to the pipeline by means of a butt weld joint, and damage to the butterfly valve and the valve seat can be effectively prevented during welding.

According to one preferred further development of the invention, the butterfly valve is dynamically connected to a drive shaft that is supported in a bearing component, the bearing component being detachably mounted on the housing in the region of the housing opening. The butterfly valve can be easily pivotally arranged and supported in the housing with a bearing component that can be mounted on the housing.

Advantageously, the drive shaft has one shaft section supported in the bearing component and one shaft section supported in the housing, the butterfly valve being detachably mounted on the shaft sections. A large flow cross-section can be easily achieved in the pipeline when the butterfly valve is opened by such a divided drive shaft on which the butterfly valve is detachably mounted, one shaft section being supported in the bearing component and one shaft section being supported opposite the bearing component in the housing.

To the extent a drive means that is dynamically connected to the drive shaft is mounted on the bearing component according to one further development of the invention, the arrangement of the drive means for driving the butterfly valve is simple and favorable.

According to one preferred embodiment of the invention, a mounting flange, especially a screw flange, for attachment of the bearing component is made on the housing opening. With such a mounting flange, the bearing component, in which the drive shaft provided with the butterfly valve is supported and on which the drive means is located, can be easily mounted on the housing.

To the extent a centering and/or sealing means is arranged between the mounting flange and the bearing component according to one preferred further development of the invention, the bearing component with the drive shaft and the butterfly valve can be easily centered relative to the housing that is provided with the valve seat, and sealing of the housing opening against leakage can be achieved.

For the centering and/or sealing means, the construction cost is low when the centering and/or sealing means according to one embodiment of the invention is designed as a projection that is located in a peripheral groove.

If, according to one further development of the invention, a blind flange can be detachably mounted on the mounting flange located on the housing opening, for a bearing component that has been removed for maintenance or inspection and thus for a removed butterfly valve and optionally removed valve seat component, the housing opening can be sealed at low construction cost in order to enable further operation of the system provided with the pipeline.

Special advantages arise when—according to one further development of the invention—a mounting means for detachable mounting of a testing means is made on the housing in the region of the welding flange. With such a mounting means, after production of the shut-off device and before mounting of the housing in the pipeline, a testing means can be easily mounted in order to conduct a test, especially a tightness test, of the shut-off device. After testing the shut-off device, no further mechanical working of the shut-off device, especially of the housing in the region of the welding flange, is necessary in this case.

Advantageously, the mounting means is designed as a peripheral groove that is located on the housing. The testing means can be located on a mounting means that is formed by a groove, at low production cost.

After mounting the housing in the pipeline and thus after welding the housing to the pipeline, inspection, especially a tightness and operational test, of the butterfly valve and of the valve seat can be easily done, when there is a test housing in which the bearing component provided with the butterfly valve and the valve seat component can be detachably mounted. After removing the bearing component -with the drive shaft, the drive means and the butterfly valve as well as the valve seat component via the housing opening from the housing welded to the pipeline—and after mounting the valve seat component and the bearing component— provided with the butterfly valve, the drive means and the drive means in the test housing—a tightness and operational test of the butterfly valve and of the valve seat component can be done at low construction cost.

Figures 2, 3:
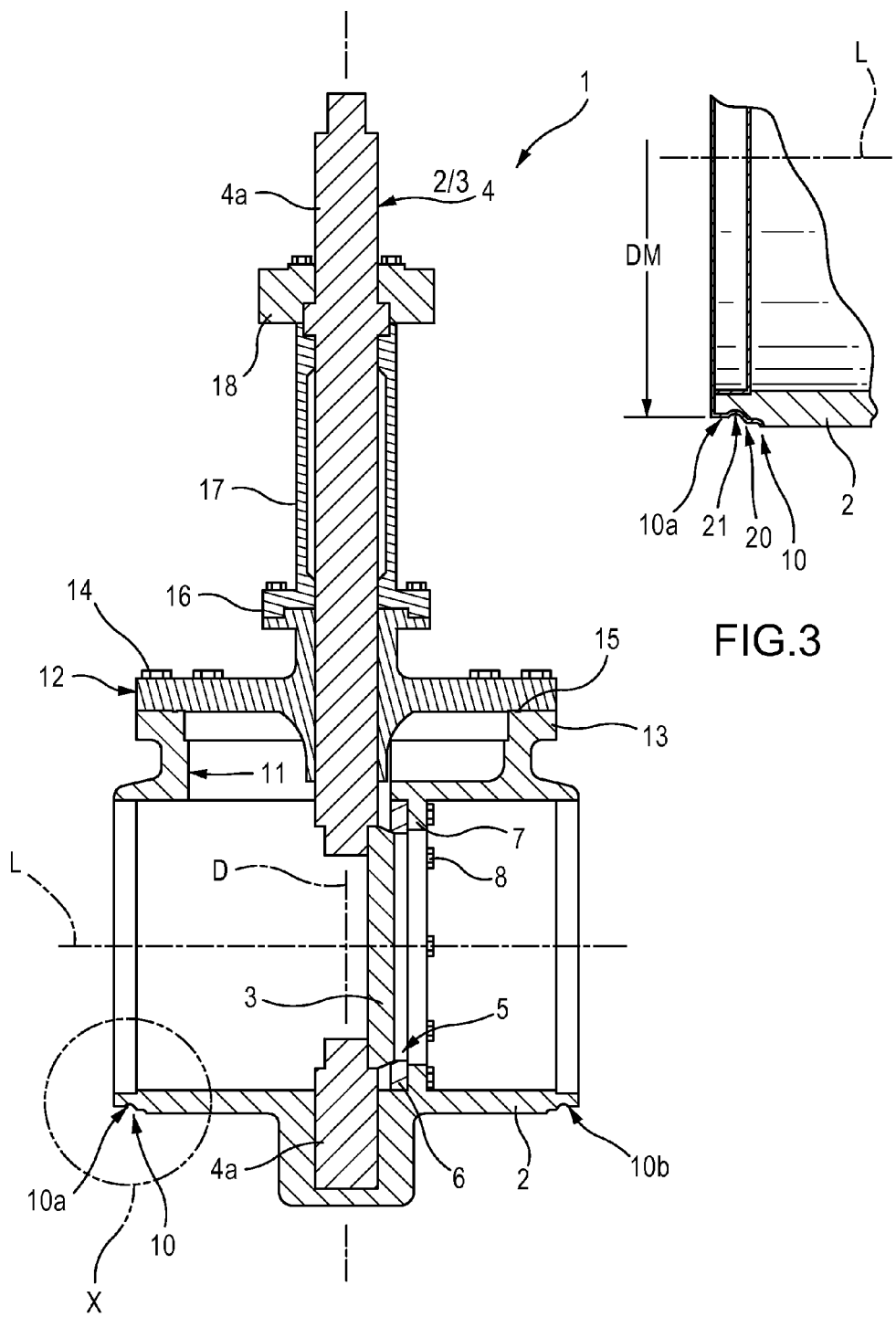
Figure 4:
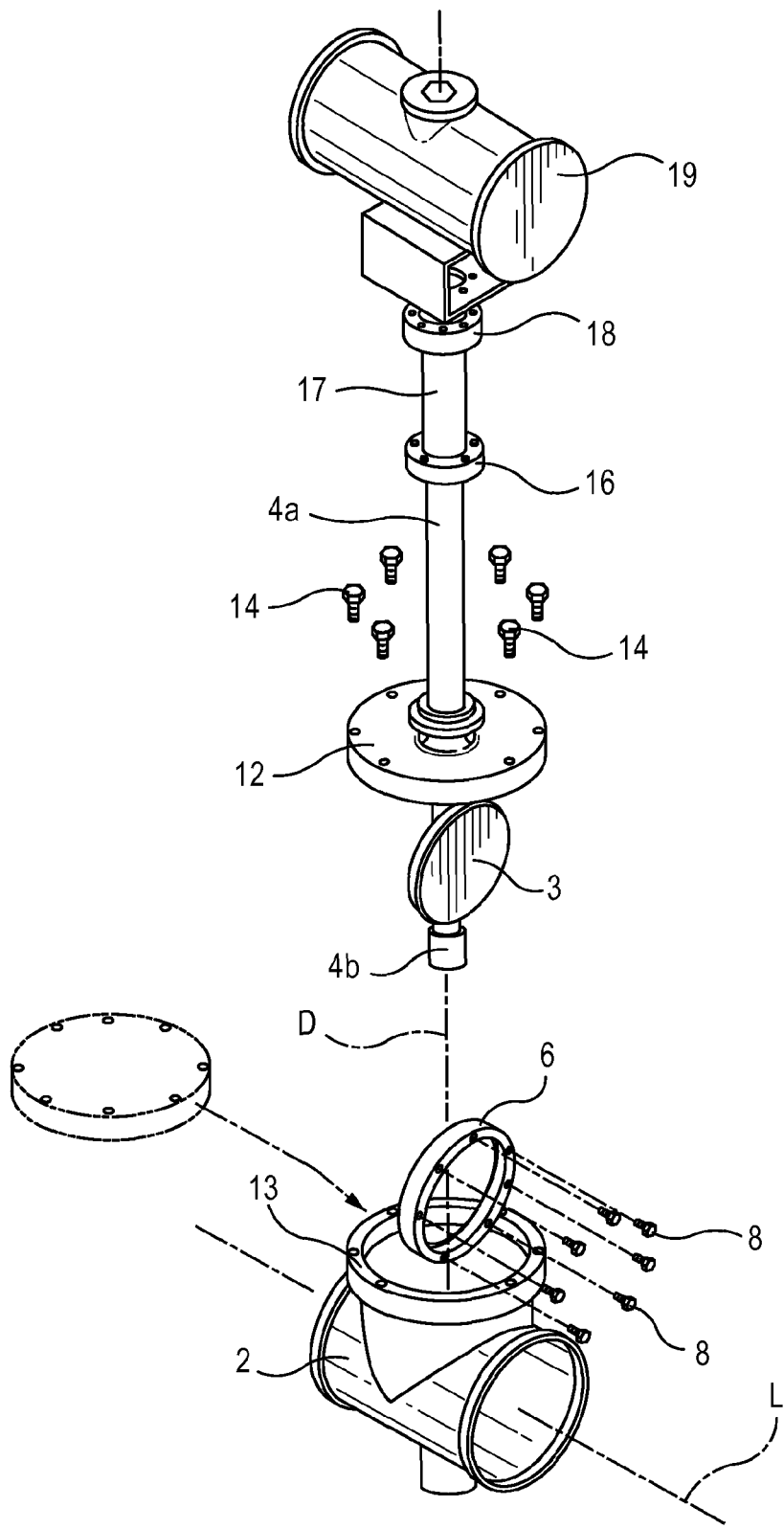

Other advantages and details of the invention are explained in more detail using the embodiment shown in the diagrammatic figures. In this connection:

FIG. 1 shows a perspective view of a shut-off device according to the invention, FIG. 2 shows a shut-off device in a longitudinal section, FIG. 3 shows detail X of FIG. 2 in an enlarged view, and FIG. 4 shows the shut-off device in a mounting/removal view.

The figures show a low-temperature shut-off device 1 according to the invention that is designed, for example, as a double-cam shut-off device. The shut-off device 1 has a housing 2, in which a butterfly valve 3 in the form of a disc that triggers a valve seat 5 is supported to pivot around an axis of rotation D. FIG. 2 shows the butterfly valve 3 in the shut-off position. By means of a drive shaft 4 that is divided with respect to the longitudinal axis L and that comprises one shaft section 4*a* and one shaft section 4*b* on which the butterfly valve 3 is detachably mounted, the butterfly valve 3 can be turned in a flow position parallel to the longitudinal axis L and thus parallel to the flow direction.

According to the invention, the housing 2 on the pipe-side ends shown at left and right in FIG. 2 is provided with flanges 10 that are designed as welding flanges 10*a*, 10*b*, by means of which the housing 2 can be mounted in a pipeline that is no longer shown and that is coaxial to the longitudinal axis L. The housing diameter DM of the housing 2 in the region of the welding flange 10*a*, 10*b* in this regard—as is illustrated in FIG. 3—corresponds to the pipe diameter of the pipeline so that the weld joint can be designed as a butt weld joint.

In addition, on the housing 2, according to the invention, perpendicular to the axis of rotation D, a housing opening 11 is made, through which the butterfly valve 3 can be mounted or removed.

In the housing 2, there is an annular valve seat component 6, on which the valve seat 5 is made. In the housing 2, to attach the valve seat component 6, an annular flange 7 that extends radially to the inside is designed as a screw flange, and the valve seat component 6 can be mounted on the flange 7 by means of fastening screws 8. Between the butterfly valve 3 and the valve seat component 6, there can be a sealing system, which is no longer shown, for example a so-called block-and-bleed sealing system.

The shaft section 4*b* of the drive shaft 4 is pivotally mounted in the housing 2, the housing 2 being provided with a corresponding bearing hole.

To support the shaft section 4*a*, there is a bearing component 12 having a lateral extent greater than the housing opening that seals the housing opening 11. The bearing component 12 in this connection is detachably mounted on the housing 2 in the region of the housing opening 11 by means of an annular mounting flange 13 that is made on the housing opening 11. The mounting flange 13 in this respect is designed as a screw flange, and the bearing component 12 can be attached to the housing 2 by means of fastening screws 14.

Between the mounting flange 13 and the bearing component 12, there is a centering and sealing means 15 that is formed by a peripheral groove made in the mounting flange 13 and a projection that is made on the bearing component 12 and that engages in the groove.

In addition, on the bearing component 12, by means of an annular mounting flange 16 that has fastening screws 22 and that is designed as a screw flange, a tubular carrier component 17 is attached, on which by means of an annular mounting flange 18 that has fastening screws 23 and that is designed as a screw flange, a drive means 19 is detachably mounted that is dynamically connected to the drive shaft 4 and thus to the butterfly valve 3.

The welding flange 10*a* that is made on the housing 2—as is apparent from FIG. 3—is formed by a peripheral groove that is located on the outer periphery of the housing 2, in the region of the peripheral groove a mounting means 20 formed by a groove 21 being made for a testing means.

To mount the shut-off device 1 in the pipeline, the housing 2 is connected to the pipeline by means of the welding flanges 10*a*, 10*b* and the butt weld joints. In this way, without additional sealing means and at low construction cost, a leak-free connection of the housing 2 to the pipeline can be achieved. The butterfly valve 3 and the valve seat component 6 can be mounted and removed via the housing opening 11.

The bearing component 12—in which the drive shaft 4*a*, to which the butterfly valve 3 and the drive shaft 4*b* are attached, is supported—and to which the drive means 19 is attached by means of the carrier component 17, as well as the valve seat component 6 can in this connection be fastened to the flanges 13, 7 before or after welding of the housing 2 to the pipeline by means of the mounting screws 14, 8.

For testing, especially a tightness test, of the shut-off device 1 before installation of the housing 2 in the pipeline, on the fastening means 20 made in the region of the welding flanges 10*a*, 10*b*, a testing means (not shown) is attached, for example by means of a clamp connection. With such a testing means that can be detachably mounted on the shut-off device 1 by means of the mounting flanges 20, after producing the shut-off device 1 and before mounting the housing 2 in the pipeline, testing, especially a tightness test, of the shut-off device 1 can be easily carried out.

After mounting the housing 2 in the pipeline and thus after welding the housing 2 to the pipeline by means of the welding flanges 10*a*, 10*b*, an inspection, especially a tightness and operational test, of the butterfly valve 3 and of the valve seat 5 can be easily carried out when there is a test housing in which the bearing component 12 that is provided with the butterfly valve 3 and the valve seat component 6 can be detachably mounted. To do this, the bearing component 12 can be released from the mounting flange 13 of the housing 2 by means of the fastening screws 14, by which the butterfly valve 3 that is located over the drive shaft 4a on the bearing component 12 together with the drive shaft 4b can be removed from the housing 2 via the housing opening 11. After loosening the fastening screws 8 of the flange 7, the valve seat component 6 can likewise be removed from the housing 2 via the housing opening 11. Accordingly, the bearing component (12), drive shaft (4) and shut-off valve (3), are connected to one another so as to be removable from the housing (2) as an integral assembly.

The bearing component 12 that is provided with drive shafts 4a, 4b, and the butterfly valve 3 and the drive means 19, and the valve seat component 6 can thereupon be located in a test housing, by which a tightness and operational test of the butterfly valve 3 and of the valve seat component 6 can be carried out at low construction cost. When the valve seat component 6 and the bearing component 12 to which the butterfly valve 3 is attached have been removed from the housing 2, the housing opening 11 can be sealed by a blind flange, which can be mounted on the mounting flange 13, by means of the fastening screws 14, by which the housing opening 11 is easily sealed and thus further operation of the system provided with the pipeline is made possible.

The invention claimed is:

1. Low-temperature shut-off device (1) for use in a pipeline transporting cryogenic media, the device (1) comprising: a single housing (2), a valve seat (5) arranged in the housing (2), and a butterfly valve (3) that cooperates with the valve seat (5) to open and shut-off the device (1) and is mounted to rotate in the housing (2), wherein the housing (2) has at least one end flange (10a or 10b) configured to attach the shut-off device (1) to a pipeline, the end flange (10a or 10b) of the housing (2) being a welding flange (10a, 10b) to attach the shut-off device (1) to the pipeline and configured as a butt-welded joint, the housing (2) being provided with a housing opening (11) for installation and removal of the butterfly valve (3); the valve seat (5) being defined by a valve seat component (6), which valve seat component (6) is removably attached within the housing (2) by a screw receiving flange (7) in the housing (2); the butterfly valve (3) being connected to a drive shaft (4) mounted in a bearing component (12) having a lateral extent sufficient to cover and close the housing opening (11), the bearing component (12), drive shaft (4) and butterfly valve (3) being connected to one another so as to be removable from the housing (2) as an integral assembly, the bearing component (12) being removably attached to the housing (2) adjacent to the housing opening (11), and the valve seat component (6) being installed in and removable from the housing (2) through the housing opening (11) while the housing (2) is in place in a pipeline.

2. Shut-off device according to claim 1, wherein the housing opening (11) is located perpendicular to the axis of rotation (D) of the butterfly valve (3).

3. Shut-off device according to claim 1, wherein the housing diameter (DM) of the housing (2) in the region of the welding flange (10a, 10b) corresponds to the pipe diameter of the pipeline.

4. Shut-off device according to claim 1, wherein the drive shaft (4) has one shaft section (4a) supported in the bearing component (12) and one shaft section (4b) supported in the housing (2), the butterfly valve (3) being detachably mounted on the shaft sections (4a, 4b).

5. Shut-off device according to claim 1, wherein a drive means (19) that is dynamically connected to the drive shaft (4) is mounted on the bearing component (12).

6. Shut-off device according to claim 1, wherein a mounting flange (13), is made on the housing opening (11) for attachment of the bearing component (12).

7. Shut-off device according to claim 6, wherein there is a centering and/or sealing means (15) between the mounting flange (13) and the bearing component (12).

8. Shut-off device according to claim 7, wherein the centering and/or sealing means (15) is designed as a projection that is located in a peripheral groove.

9. The shut-off device of claim 6, wherein a mounting flange (13) is a screw flange.

10. The low temperature shut-off device (1) of claim 9, wherein the bearing component (12) is unitary.

11. The low temperature butterfly valve (3) of claim 1, wherein the butterfly valve is a disc valve.

\* \* \* \* \*